United States Patent Office
3,526,634
Patented Sept. 1, 1970

3,526,634
ALKYLBENZOYLCARBINOL ESTERS
Haruhiko Adachi, Nada-ku, and Takuichi Miki, Amagasaki, Japan, assignors to Takeda Chemical Industries, Ltd., Osaka, Japan
No Drawing. Filed Oct. 30, 1967, Ser. No. 679,206
Int. Cl. C07d 31/36; C07c 69/14
U.S. Cl. 260—295.5      14 Claims

ABSTRACT OF THE DISCLOSURE

Alkylbenzoylcarbinol esters of the formula

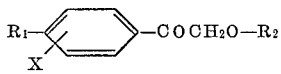

wherein $R_1$ is an alkyl radical having from 3 to 10 carbon atoms, cycloalkyl having up to 6 carbon atoms, cycloalkyl substituted alkyl having up to 10 carbon atoms wherein the cycloalkyl ring contains up to 6 carbon atoms, $R_2$ is an acyl radical of an alkanecarboxylic acid having up to 10 carbon atoms, benzoic acid, furoic acid and nicotinic acid or an inorganic radical derived from an inorganic polybasic acid by the removal of OH therefrom, and X is hydrogen or halogen attached in ortho- or meta-position to the group $R_1$ in the benzene ring, have hypothermic or anti-inflammatory activity with low toxicity to mammals.

---

The present invention relates to novel and useful compounds.

More particularly, this invention relates to alkylbenzoylmethyl derivatives of the formula:

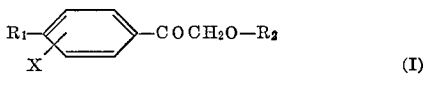 (I)

wherein $R_1$ is an alkyl radical having from 3 to 10 carbon atoms, cycloalkyl having up to 6 carbon atoms, cycloalkyl substituted alkyl having up to 10 carbon atoms wherein the cycloalkyl ring contains up to 6 carbon atoms, $R_2$ is the acyl radical of an alkanecarboxylic acid having up to 10 carbon atoms, benzoic acid, furoic acid and nicotinic acid or an inorganic radical derived from an inorganic polybasic acid by the removal of OH therefrom, and X is hydrogen or a halogen, attached in ortho- or meta-position to the group $R_1$ in the benzene ring.

As regards the above-mentioned formula, the hydrocarbon residue is exemplified by a straight or branched alkyl and a cycloalkyl radical, such as n-propyl, iso-butyl, sec-butyl, neo-pentylcyclopentyl, n-hexyl, cyclopentyl, cyclohexyl, cyclohexylethyl, n-octyl, n-decyl, etc.; the group $R_2$ is exemplified by formyl, acetyl, valeryl, benzoyl, furoyl, nicotinoyl, phosphono, sulfo, etc.; and the halogen is exemplified by Cl, Br, I.

These novel alkylbenzoylmethyl derivatives of Formula I have remarkable hypothermic or anti-inflammatory activity with low toxicity to mammals.

It is an object of the present invention to provide the novel alkylbenzoylmethyl esters of Formula I. Another object is to provide a method of producing the alkylbenzoylmethyl esters of Formula I.

These objects are realized by reacting alkylbenzoylmethyl halide of the formula:

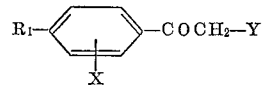
(II)

where $R_1$ and X have the same meanings as above, and Y stands for halogen (e.g. Cl, Br or I), with an acid of the formula:

$$R_2\text{—OH} \quad (III)$$

where $R_2$ has the same meanings as above, or its metal salts (e.g. salts of metals such as Hg, Ag, Na or K) or its tertiary amine salts (such as salts of pyridine, trimethylamine, etc.) or its quaternary ammonium salts (such as the trimethylbenzylammonium salt, etc.).

The organic acid represented by Formula III embodies carboxylic acid of up to 10 carbon atoms (for example, acetic acid, propionic acid, isobutyric acid, caproic acid, cyclopentylpropionic acid, diethylaminoacetic acid, succinic acid, tartaric acid, malic acid, nicotinic acid, isonicotinic acid, benzoic acid, salicyclic acid, anthranilic acid, indoleacetic acid, etc.) and inorganic polybasic acid (for example, sulfonic acid, phosphoric acid, etc.).

The reaction of the present invention is in general carried out in an organic solvent such as lower alcohol (e.g. methanol, ethanol, etc.), cycloether (e.g. tetrahydrofuran, dioxane, etc.), ketone (e.g. acetone, methyl ethyl ketone, cyclohexanone, etc.), halogenated hydrocarbon, acetonitrile, dimethylformamide, dimethylsulfoxide, pyridine, acetic acid, propionic acid, etc. A lower fatty acid such as acetic acid or propionic acid can act as the reactant $R_2OH$ as well as the solvent.

The reaction temperature is suitably selected depending on other reaction conditions such as the reactants or the solvent employed, usually ranging from room temperature (15° to 25° C.) to about 150° C. It is recommended that the reaction be carried out under conditions which are as anhydrous as possible.

Alkylbenzoylmethyl derivatives of Formula I thus produced are exemplified as follows:

p-isobutylbenzoylmethyl nicotinate;
p-isobutylbenzoylmethyl phosphate;
p-cyclohexylbenzoylmethyl acetate;
p-cyclohexylbenzoylmethyl phosphate;
p-isobutylbenzoylmethyl acetate;
p-cyclohexylbenzoylmethyl nicotinate;
p-sec-butylbenzoylmethyl acetate;
p-tert-butylbenzoylmethyl nicotinate;
p-sec-butylbenzoylmethyl phosphate;
p-sec-butylbenzoylmethyl nicotinate;
p-n-octylbenzoylmethyl phosphate;
p-n-octylbenzoylmethyl nicotinate;
p-cyclopentylmethylbenzoylmethyl acetate;
p-cyclopentylmethylbenzoylmethyl phosphate;
p-cyclopentylmethylbenzoylmethyl nicotinate;
p-cyclohexyl-m-chlorobenzoylmethyl acetate;
p-tert-butylbenzoylmethyl acetate;
p-tert-butylbenzoylmethyl phosphate;
p-n-butylbenzoylmethyl acetate;
p-n-butylbenzoylmethyl phosphate;
p-n-butylbenzoylmethyl nicotinate;
p-n-octylbenzoylmethyl acetate;
p-cyclohexyl-m-chloro-benzoylmethyl phosphate;
p-cyclohexyl-m-chloro-benzoylmethyl nicotinate;
p-cyclohexyl-m-chloro-benzoylmethyl acetate; etc.

The compounds of Formula I exhibit hypothermic or anti-inflammatory activity when administered to mammals, as shown, for example, in the following tests.

In the tests, the test compounds are referred to as follows:

Test compound:
A = p-n-butybenzoylmethyl acetate,
B = p-isobutylbenzoylmethyl acetate,
C = p-tert-butylbenzoylmethyl acetate,
D = p-n-butylbenzoylmethyl phosphate (monosodium salt).
E = p-sec-butylbenzoylmethyl phosphate (monosodium salt).
F = p-tert-butylbenzoylmethyl phosphate (monosodium salt).
Control compound = (p-isobutylphenyl) acetic acid, known as ibufenac.

TEST 1

Hypothermic activities of compounds (I) were tested using mice, to which 150 milligrams of the test compound per kilogram of body weight was intraperitoneally administered to give the result shown in Table I, where the activity is expressed in terms of the drop of body temperature in degree(s) centigrade.

TABLE 1.—DROP OF BODY TEMPERATURE (° C.)

| Test compound | Time after administration (minutes) | | | | | | |
|---|---|---|---|---|---|---|---|
| | 15 | 30 | 60 | 90 | 120 | 150 | 180 |
| A | 2.45 | 2.60 | 2.10 | 1.35 | 1.00 | 0.70 | 0.35 |
| B | 2.00 | 2.30 | 2.30 | 2.30 | 1.70 | 1.55 | 1.35 |
| C | 2.25 | 2.50 | 2.00 | 1.50 | 1.35 | 1.10 | 1.10 |
| D | 1.40 | 1.80 | 1.90 | 1.95 | 1.85 | 1.25 | 1.25 |
| E | 2.40 | 2.90 | 2.15 | 1.65 | 1.10 | 0.45 | 0.20 |
| F | 2.85 | 3.15 | 1.30 | 0.95 | 0.85 | 0.55 | 0.45 |
| Control | 1.55 | 1.65 | 0.95 | 0.45 | 0.25 | 0.10 | 0 |

TEST II

Anti-inflammatory activities were tested according to the method described in Proc. Soc. Exp. Biol. Med., vol. 3, pp. 544 (1962) against edema caused by the injection of carrageenin in rats. The results are shown in Table II in which the activities are expressed in terms of inhibition percentages.

TABLE II.—INHIBITION PERCENTAGE IN CARRAGEENIN EDEMA

| Test compound | Time after administration (hours) | | | | |
|---|---|---|---|---|---|
| | 1 | 2 | 3 | 4 | 5 |
| D | 37 | 74 | 70 | 67 | 65 |
| Control | 50 | 66 | 51 | 46 | 47 |

TEST III

Median lethal doses ($LD_{50}$) of the compounds (I) in mice when administered intraperitoneally are shown in Table III, from which it is noted that the compounds of the present invention show very low toxicity:

TABLE III

Compound: $LD_{50}$ (mg./kg.)
B _____ 1,550
C _____ 1,640
G _____ 1,630
Control compound _____ 720

As shown in the above tests, the compounds of Formula I have very low toxicity and exhibit remarkable hypothermic effect.

The compounds of the present invention are used as a pyretolytic agent or as an anti-inflammatory agent for mammals, and also to suppress pain caused by inflammation.

When the group $R_2$ of the compound (I) is one derived from a polybasic acid, irrespective of whether it is inorganic or organic, by the removal of an OH therefrom, the compound (I) constitutes a partial ester and can form a salt with a metal (such as sodium, potassium, magnesium) or an amine (such as diethylamine, triethylamine, ethylenediamine, diethanolamine or ammonium), and in so far as the salts are pharmaceutically acceptable, they are also used for the same purpose as the corresponding partial ester and on the same molar basis.

In human beings, the dose of present compound (I) is usually 500 to 2500 milligrams per day, and the compounds (I) are generally administered in the form of capsule, tablet, syrup, injection, ointment, etc.

The following examples show presently preferred embodiments of this invention but are not to be construed as restrictive. It is to be understood that the following examples are solely for the purpose of illustration and not for limitation of this invention, and that variations may be resorted to without departing from the spirit of the invention. In the example, parts by weight bear the same relation to parts by volume as do grams to milliliters.

Example 1

4.7 parts by weight of p-isobutylbenzoylmethyl iodide (M.P. 60° C.), 2.2 parts by weight of nicotinic acid and 4.5 parts by weight of triethylamine are dissolved in 30 parts by volume of acetone. The mixture is left standing at room temperature for five hours. After the acetone has distilled off, 50 parts by volume of ether and 20 parts by volume of water are added to the residue, and the mixture is shaken. The ether layer is extracted with 30 parts by volume of 10% hydrochloric acid, and the acid solution is alkalified with sodium carbonate and is extracted with ether. The ethereal extract is washed with water and dehydrated over anhydrous sodium sulfate, and the ether is distilled off to leave 1.2 parts by weight of p-isobutylbenzoylmethyl nicotinate as pale yellow prisms melting at 93° C., the hydrochloride of which is soluble in water.

Analysis.—Calculated for $C_{18}H_{19}O_3N$ (percent): C, 72.70; H, 6.44; N, 4.70. Found (percent): C, 72.29; H, 6.38; N, 4.64.

The starting material, p-isobutylbenzoylmethyl iodide, is prepared, for example, by reacting p-isobutylbenzoylmethyl chloride with sodium iodide in acetone.

Example 2

To a mixture of 6.3 parts by weight of trisilver phosphate and 3.6 parts by weight of 85% phosphoric acid, there are added 50 parts by volume of acetonitrile and 6 parts by weight of p-isobutylbenzoylmethyl iodide. After the whole mixture is refluxed for four hours under mild heating with agitation, the resultant precipitates are filtered off and from the filtrate the acetonitrile is distilled off. Water is added to the residue, followed by the addition of activated carbon to adsorb the product thereon. The carbon is filtered off, washed with water and eluted with an aqueous sodium hydroxide solution. The eluate is concentrated under reduced pressure, and acetone is added to the concentrate to precipitate sodium salt of p-isobutylbenzoylmethyl phosphate.

Example 3

A mixture of 4.9 parts by weight of p-cyclohexylbenzoylmethyl iodide, 15 parts by weight of sodium acetate and 150 parts by volume of acetone is boiled for one hour, and the solvent is distilled off. Ether and water are added to the residue, and the mixture is agitated. The ether layer is separated from the aqueous layer, and is concentrated. After the addition of about the equivolume of petroleum ether to the concentrate, the mixture is left standing to give 1.8 part by weight of p-cyclohexylbenzoylmethyl acetate as colorless prisms, melting at 77° to 78° C.

The starting material, p-cyclohexylbenzoylmethyl iodide is prepared by, for example, reacting p-cyclohexylbenzoylmethyl chloride with sodium iodide in acetone.

Example 4

49 parts by weight of p-cyclohexylbenzoylmethyl iodide is added to the slurry obtianed by the reaction of 60 parts by weight of trisilver phosphate and 50 parts by weight of 85% phosphoric acid in 100 parts by volume of acetonitrile in the presence of 5 parts by weight of diatomaceous earth, and the mixture is boiled while being agitated for 3.5 hours. After cooling, 200 parts by volume of water is added to the reaction mixture, and the resultant mixture is adjusted to pH 7.5 by the addition of a 20% aqueous sodium hydroxide solution to precipitate silver iodide, which is then filtered off. The filtrate is concentrated under reduced pressure to remove acetonitrile. 120 parts by weight of activated carbon is added to the residue. After being adjusted to pH 2 with hydrochloric acid, the mixture is filtered to collect the activated carbon, which is then washed with water until the washing shows pH 4. The washed carbon is suspended in methanol, and the suspension is adjusted to pH 8 by the addition of a 20% aqueous sodium hydroxide solution and is extracted with 2000 parts by volume of methanol. The methanol extract is concentrated under reduced pressure. Acetone is added to the concentrate to precipitate sodium p-cyclohexylbenzoylmethyl phosphate.

The NMR (nuclear-magnetic resonance) of the product in $D_2O$ shows doublet at 4.8τ, which reveals that methylene is attached to

In the same manner as in the preceding examples, the alkyl benzoylmethyl derivatives listed in the following Table IV, are produced.

TABLE IV

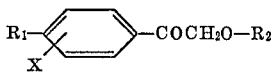

| Ex. | $R_1$ | $R_2$ | X | NMR (τ) | Boiling point, °C (2mm. Hg) |
|---|---|---|---|---|---|
| 5 | $CH_3.CH_2.CH(CH_3)-$ | $-COCH_3$ | H | [1] 4.82 | 135–145 |
| 6 | $CH_3.CH_2.CH(CH_3)-$ | $-PO(OH)_2$ | H | [2] 4.8 | |
| 7 | $CH_3.C(CH_3)_2-$ | $-COCH_3$ | H | [1] 4.87 | 135–145 |
| 8 | $CH_3.C(CH_3)_2-$ | $-PO(OH)_2$ | H | [2] 4.8 | |
| 9 | $CH_3.CH_2.CH_2.CH_2-$ | $-COCH_3$ | H | [1] 4.85 | 135–145 |
| 10 | $CH_3.CH_2.CH_2.CH_2-$ | $-PO(OH)_2$ | H | [2] 4.8 | |
| 11 | $CH_3.CH.CH_2(CH_3)-$ | $-COCH_3$ | H | [1] 4.82 | 135–145 |
| 12 | $CH_3.(CH_2)_7-$ | $-COCH_3$ | H | [1] 4.85 | 175 |
| 13 | $CH_3.(CH_2)_7-$ | $-PO(OH)_2$ | H | [2] 4.8 | |
| 14 | cyclopentyl-CH_2- | $-COCH_3$ | H | [1] 4.85 | 170 |
| 15 | cyclopentyl-CH_2- | $-PO(OH)_2$ | H | [2] 4.8 | |
| 16 | cyclohexyl- | $-COCH_3$ | m-Cl | [1] 4.82 | 200 |
| 17 | cyclohexyl- | $-PO(OH)_2$ | m-Cl | [2] 4.7 | |
| 18 | cyclohexyl- | $-CO-$pyridyl | H | [2] 4.62 | |

[1] Singlet.   [2] Doublet.

What is claimed is:
1. A compound of the formula:

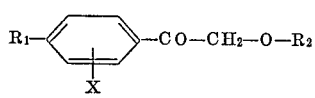

wherein $R_1$ is an alkyl radical having from 3 to 10 carbon atoms, cycloalkyl having up to 6 carbon atoms, cycloalkyl substituted alkyl having up to 10 carbon atoms wherein the cycloalkyl ring contains up to 6 carbon atoms, $R_2$ is a member selected from the group consisting of the acyl radical of an alkanecarboxylic acid having up to 10 carbon atoms, benzoic acid, furoic acid and nicotinic acid, and X is a member selected from the group consisting of H and halogen.

2. A compound according to claim 1, wherein $R_2$ is acetyl.

3. A compound according to claim 1, wherein $R_2$ is nicotinoyl.

4. A compound according to claim 1, wherein $R_1$ is alkyl of 4 carbon atoms.

5. A compound according to claim 1, the compound being p-isobutylbenzoylmethyl nicotinate.

6. A compound according to claim 1, the compound being p-cyclohexylbenzoylmethyl acetate.

7. A compound according to claim 1, the compound being p-cyclohexylbenzoylmethyl nicotinate.

8. A compound according to claim 1, the compound being p-sec-butylbenzoylmethyl acetate.

9. A compound according to claim 1, the compound being p-tert-butylbenzoylmethyl acetate.

10. A compound according to claim 1, the compound being p-n-butylbenzoylmethyl acetate.

11. A compound according to claim 1, the compound being p-iso-butylbenzoylmethyl acetate.

12. A compound according to claim 1, the compound being p-n-octylbenzoylmethyl acetate.

13. A compound according to claim 1, the compound being p-cyclopentylmethylbenzoylmethyl acetate.

14. A compound according to claim 1, the compound being p-cyclohexyl-m-chloro-benzoylmethyl acetate.

References Cited

UNITED STATES PATENTS 3,259,647  7/1966  Hennis _____ 260—476

HENRY R. JILES, Primary Examiner

A. L. ROTMAN, Assistant Examiner

U.S. Cl. X.R.

260—295, 326.13, 347.5, 410.5, 456, 468, 471, 474, 476, 482, 485, 488, 592, 946; 424—212, 266, 274, 285, 308, 311